Nov. 29, 1960     A. D. PINOTTI     2,961,703
CENTRIFUGAL MOLDING APPARATUS

Filed July 16, 1957     3 Sheets-Sheet 1

INVENTOR.
ALFRED D. PINOTTI
BY
Rule and Hoge.

Nov. 29, 1960 — A. D. PINOTTI — 2,961,703
CENTRIFUGAL MOLDING APPARATUS
Filed July 16, 1957
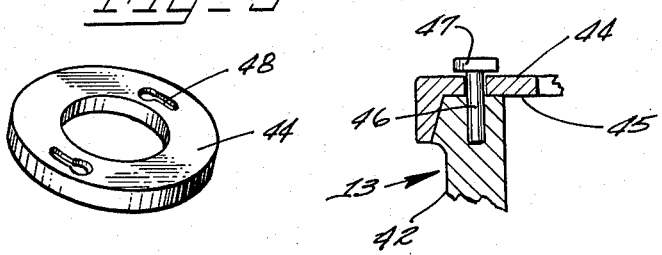
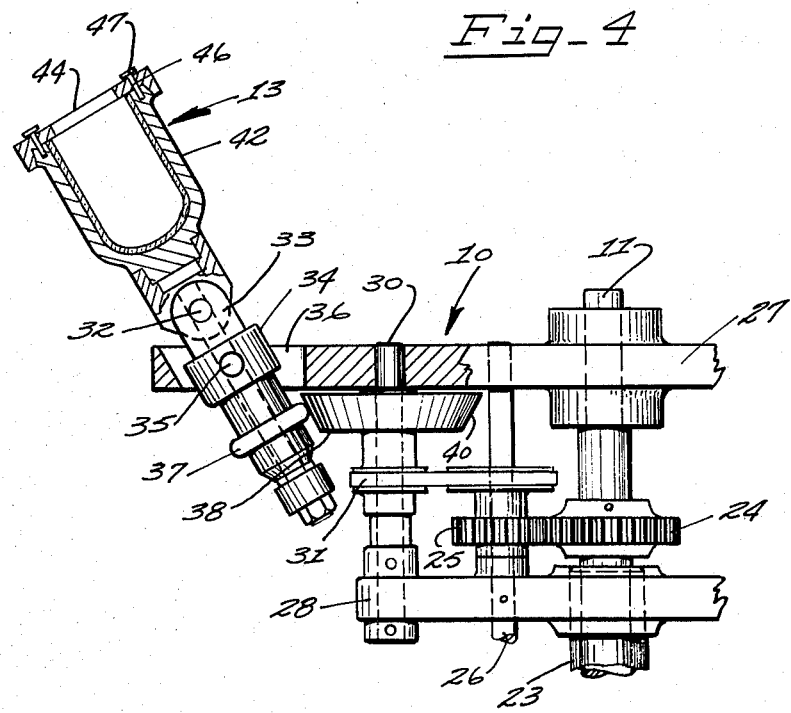
INVENTOR.
ALFRED D. PINOTTI
BY Rule and Hoge.

2,961,703
CENTRIFUGAL MOLDING APPARATUS

Alfred D. Pinotti, Toledo, Ohio, assignor to Kimble Glass Company, a corporation of Ohio Filed July 16, 1957, Ser. No. 672,252

4 Claims. (Cl. 18—26)

My invention relates to apparatus for molding or casting articles within molds by the use of centrifugal force. The invention is of use for molding plastic materials such as thermoplastics, thermosetting materials, molten glass and moldable materials generally while in a plastic moldable condition.

As herein illustrated and described the invention provides a machine or apparatus for molding hollow glass articles having cylindrical bodies or straight side walls. The machine comprises a carriage mounted for rotation about a vertical axis, with molds mounted for rotation with the carriage, the molds being spaced laterally from said axis so that they travel in a circular path. The molds are mounted for rotation about their own axes while upwardly and outwardly inclined at an acute angle to the vertical. The rotation of the molds at high speed about the vertical axis of the mold carriage and concurrently about their own inclined axes, causes the charges of plastic material therein to be spread and carried upward by centrifugal force to cover the walls of the mold cavities, thus forming hollow molded articles with the walls of uniform thickness.

Referring to the accompanying drawings which illustrate a machine for practicing the present invention:

Fig. 2 is a similar fragmentary view showing a mold in its inclined position;

Fig. 3 is a perspective view of a ring which is adapted to be mounted on the open end of the mold to form a stop for the material being molded;

Fig. 4 is a sectional detail showing means for holding said ring on the mold.

Figure 1:
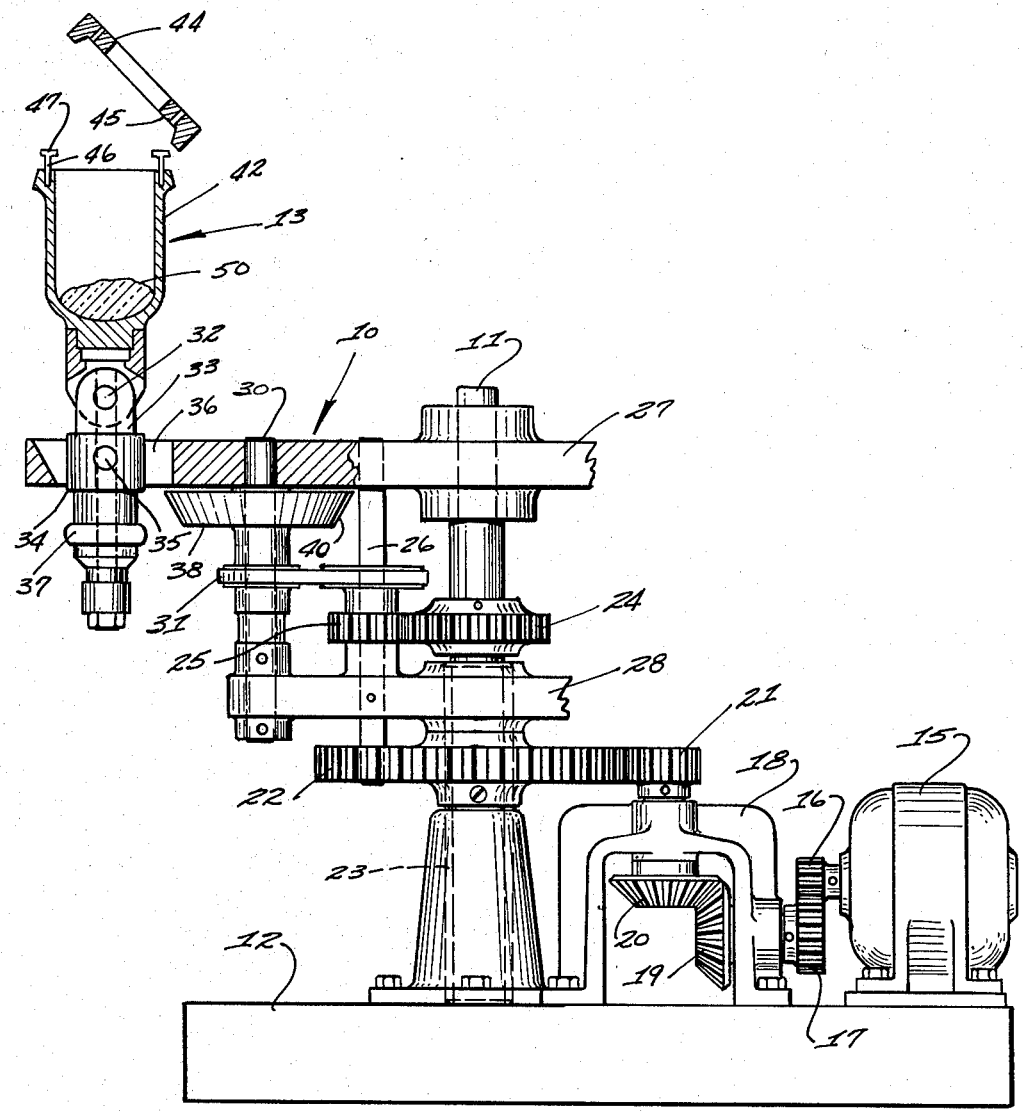
Fig. 1 is a part sectional elevational view of the machine with parts broken away.

The molding machine or apparatus comprises a carriage 10 mounted for horizontal rotation about the axis of a vertical shaft 11. The shaft has a fixed mounting on a base 12. Molds 13 are mounted on the carriage for rotation therewith about the shaft 11 and also for rotation about their own axes. Means for rotating the carriage comprises an electric motor 15 having driving connections therewith through a train of gearing including a gear 16 on the motor shaft driving a gear 17 keyed to a shaft journalled in a bearing bracket 18. The gear train includes intermeshing miter gears 19, 20 and a pinion 21 driving a gear 22. The gear 22 is keyed to a tubular shaft 23 mounted for rotation on the stationary shaft 11. A gear 24 keyed to the fixed shaft 11 intermeshes with gears 25 individual to the molds 13. Each gear 25 is journalled for rotation on a vertical shaft 26. The mold carriage includes upper and lower horizontal plates 27 and 28, tied together and to the gear 22 by the shafts 26. The carriage is also attached directly to the tubular shaft 23. Vertical shafts 30, individual to the molds 13, are journalled for rotation in the carriage members 27, 28. Each shaft 30 is driven by a belt 31 trained over pulleys on the shafts 30 and 26, the pulley on the shaft 26 being keyed to the gear 25.

Each of he molds 13 is connected by a pivot pin 32 to a carrier or shaft 33 mounted for rotation about its axis. The carrier 33 extends through and is journalled for rotation within a bearing sleeve 34. Horizontal pivot pins 35 on the sleeve 34 are journalled in the side walls of an opening 36 through which the carrier 33 extends. The construction just described permits rotation of the mold and its carrier shaft 33 as a unit about their axes which are in alignment and also permits rocking movement of the mold and its carrier about the horizontal axis of the pivot pins 35. Each carrier 33 has mounted therein a gear 37 or disk which, when the mold is swung outwardly as shown in Fig. 2, is brought into contact with a driving disk 38 fixed to the shaft 30 and having a bevelled peripheral driving surface 40 for frictional driving contact with the disk 37.

Figure 5:
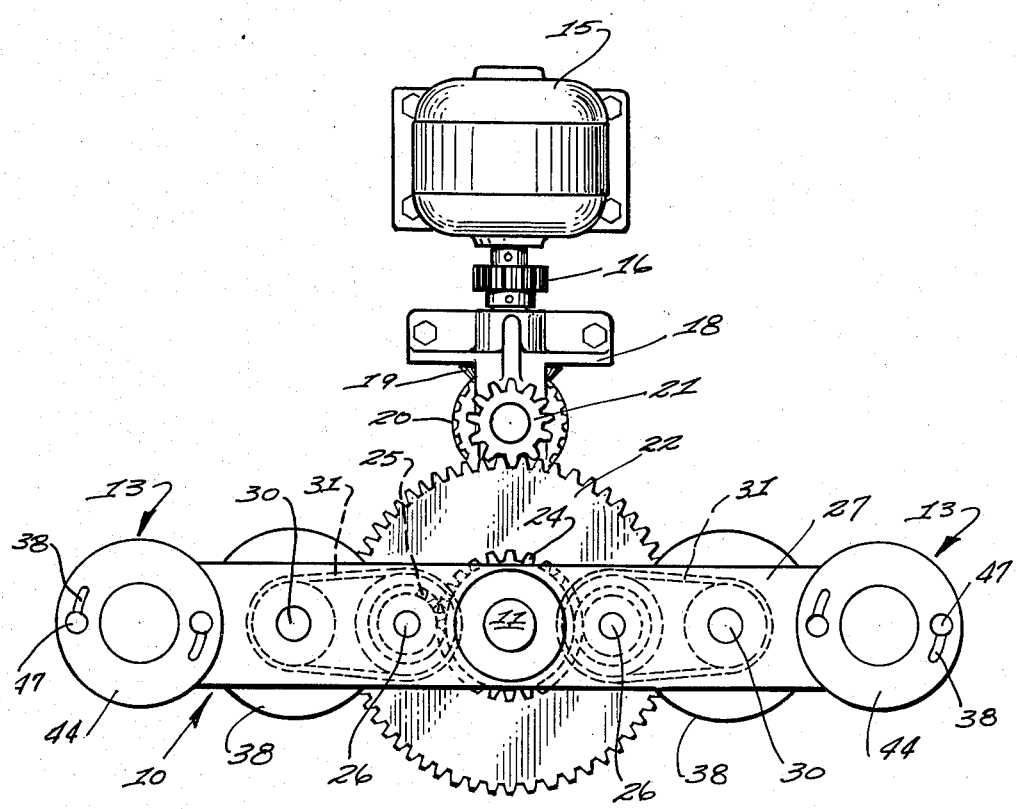
Fig. 5 is a plan view of the machine.

Each mold 13 comprises a cylindrical body 42 providing a cylindrical or approximately cylindrical mold cavity which may be designed with a small amount of draft to facilitate the removal of the molded article at the completion of the molding cycle. An annular stop plate or ring 44 fits on the upper open end of the mold and provides a stop surface 45 to arrest the molded material when it reaches the upper end of the mold during the molding cycle. The ring 44 is locked in position on the mold by locking pins 46 formed with heads 47 to pass through enlarged openings in the ends of slots 48 in the disk. As shown in Fig. 5 the mold carriage 10 carries two molds, with gearing for driving them. The number of molds however may be increased or decreased as desired.

Operation

A mold charge or mass 50 of moldable material in a soft moldable plastic condition, herein shown as a gob of molten glass, is placed in each mold. The motor 15 is then started and operates through the intermediate train of gearing to rotate the mold carriage 10 about the vertical axis of the shaft 11, thereby revolving the molds in a circular or planetary path about said axis. During this rotation the gears 25 running on the stationary gear 24 are rotated about their own axes and operate through the belt drives 31 to rotate the driving disks 38 about their axes. The molds 13 are swung by centrifugal force to the inclined position (Fig. 2), bringing the gears 37 in contact with the frictional driving surfaces 40 of the disks 38 so that the inclined molds are rotated about their own inclined axes. It will be seen that the gears 25 are given an epicyclic movement in a path surrounding the axis of the mold carriage and that the molds also have an epicyclic movement in a wider circle concentric with the said axis.

The gob 50 of moldable material is spread and moved upwardly by centrifugal force over the mold cavity walls, thereby covering the interior wall surfaces of the mold, the material being uniformly distributed over the mold walls and forming a molded article having its walls of substantially uniform thickness throughout. The upward or spreading movement of the material is arrested by the stop plate 44. The mold carriage is rotated at a high speed to quickly effect the molding operation. The speed of rotation of the molds about their own axes relative to the speed of their rotation or revolution about the vertical axis can be varied as desired by changes in the relative dimensions of the gear elements between the mold and the shaft 11.

Modifications may be resorted to within the spirit and scope of my invention.

I claim:

1. A machine for molding articles from plastic material while in a moldable plastic condition, said machine comprising a mold carriage, a vertical shaft mounted in fixed position, said carriage mounted for horizontal rotation about the axis of said shaft, a drive shaft mounted concentric with said fixed shaft, a motor geared to said drive shaft for rotating it about said axis, means connecting the carriage to the drive shaft for rotation therewith, a mold having a substantially cylindrical mold cavity, a carrier for said mold by which the mold is supported in an upright position above the mold carriage, said carrier being pivotally connected to the mold carriage for swinging movement about a horizontal axis for swinging the mold to an inclined position in which the mold and its axis are upwardly and outwardly inclined relative to the said vertical axis, and means providing the driving connection between the motor and said mold carrier while the mold is in said inclined position and thereby causing the mold to be rotated about said inclined axis concurrently with the rotation of the mold carriage and mold about said vertical axis.

2. Apparatus for molding hollow articles having essentially uniform cylindrical side walls comprising the combination of a mold carriage mounted for rotation about a vertical axis, a hollow upright mold having an open top, closed bottom and cylindrical inner surfaces, means for pivotally mounting the mold on the carriage for free swinging movement about a horizontal axis from an upright to an inclined position with the axis of the mold in a radial plane of said vertical axis and upwardly and outwardly divergent relative to said vertical axis in its inclined position, means comprising a motor and gear train extending from the motor to the mold carriage for rotating the said mold carriage about its vertical axis and thereby causing the movable mold to be swung by centrifugal force about said horizontal axis from said upright to said inclined position, and means operable by said swinging movement of the mold to establish driving connection from said gear train to the mold for rotating said mold about its longitudinal axis while in said inclined position.

3. Apparatus for molding thermoplastic moldable material by centrifugal force into hollow articles having essentially uniform cylindrical side walls, said apparatus comprising, in combination, a mold carriage mounted for rotation about a vertical axis, a motor, a train of gearing providing driving connections between the said motor and mold carriage for rotating the latter about said vertical axis, a unitary upright mold having an open top, closed bottom and substantially cylindrical inner surfaces, means for mounting the mold on the carriage for rotation therewith about said vertical axis and for swinging movement on the carriage to an inclined position in which the axis of the cylindrical mold cavity is upwardly and outwardly inclined relative to said vertical axis and resides in a radial plane of said vertical axis, and means providing a driving connection between the said motor and the said mold for rotating the latter about its longitudinal axis while in said inclined position concurrently with the rotation of the said mold carriage about its vertical axis.

4. The combined apparatus in accordance with claim 3, including a separable annular stop plate mounted over the upper open end of said mold forming a restraining surface to limit the upward and outward movement of the moldable material during rotation of said mold.

References Cited in the file of this patent
UNITED STATES PATENTS

| | | |
|---|---|---|
| 803,799 | Voelke | Nov. 7, 1905 |
| 950,884 | Winner | Mar. 1, 1910 |
| 1,501,337 | Henry | July 15, 1924 |
| 1,501,338 | Henry | July 15, 1924 |
| 1,875,031 | Landav | Aug. 30, 1932 |
| 2,221,695 | Robertson | Nov. 12, 1940 |
| 2,222,266 | Rubissow | Nov. 19, 1940 |
| 2,603,836 | Rempel | July 22, 1952 |
| 2,681,472 | Rempel | June 22, 1954 |
| 2,778,162 | Giffen | Jan. 22, 1957 |

FOREIGN PATENTS

| | | |
|---|---|---|
| 491,020 | France | Jan. 20, 1919 |